Figure 13:
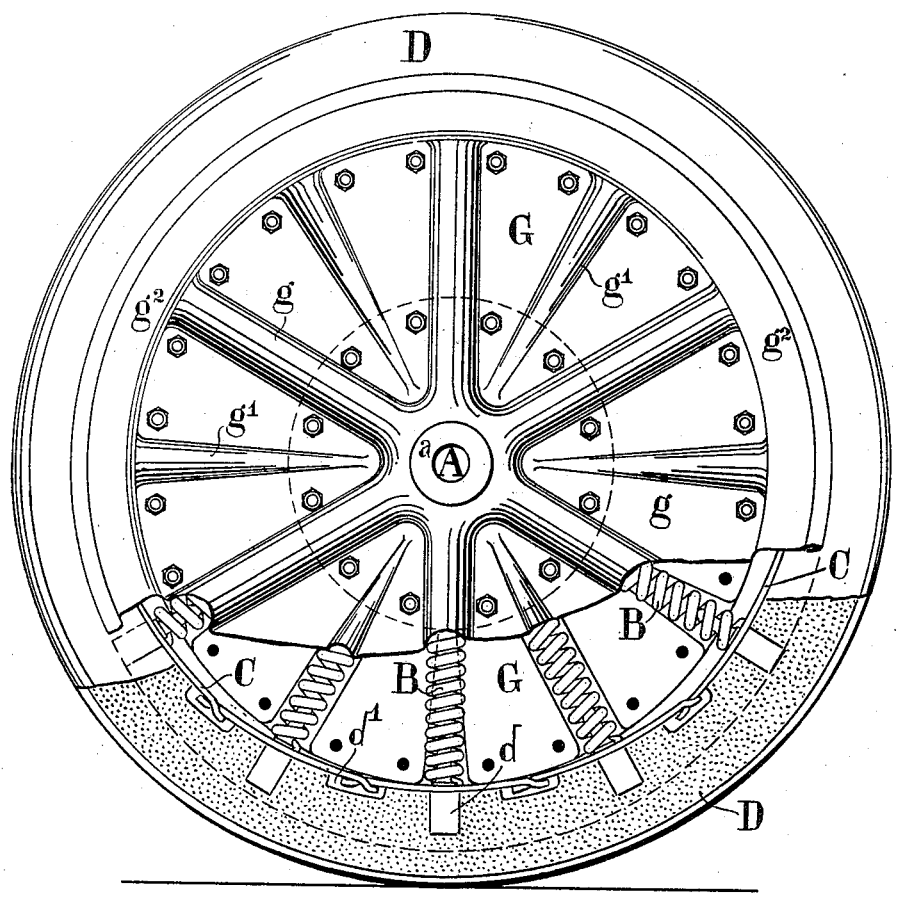

T. WHITEHEAD.
ELASTIC WHEEL.
APPLICATION FILED DEC. 12, 1911.
1,051,178.
Patented Jan. 21, 1913.
3 SHEETS—SHEET 1.
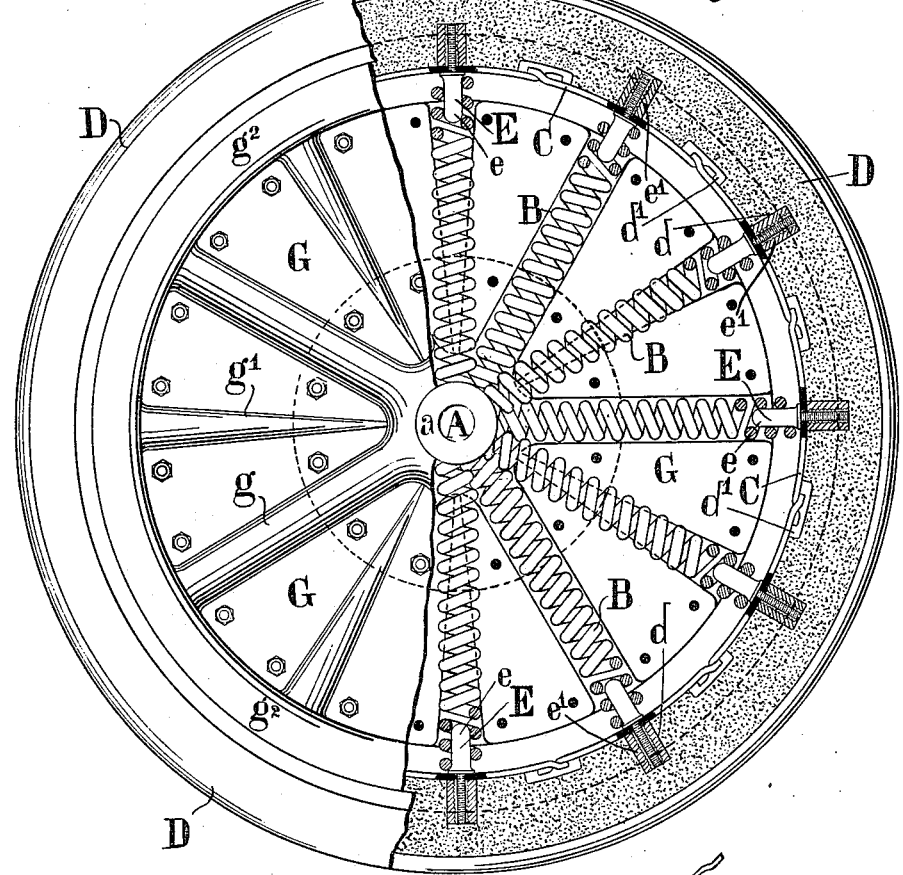
Fig. 5.
Fig. 1.
Fig. 9.
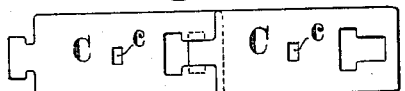
Fig. 10.
WITNESSES.
INVENTOR.
Thomas Whitehead

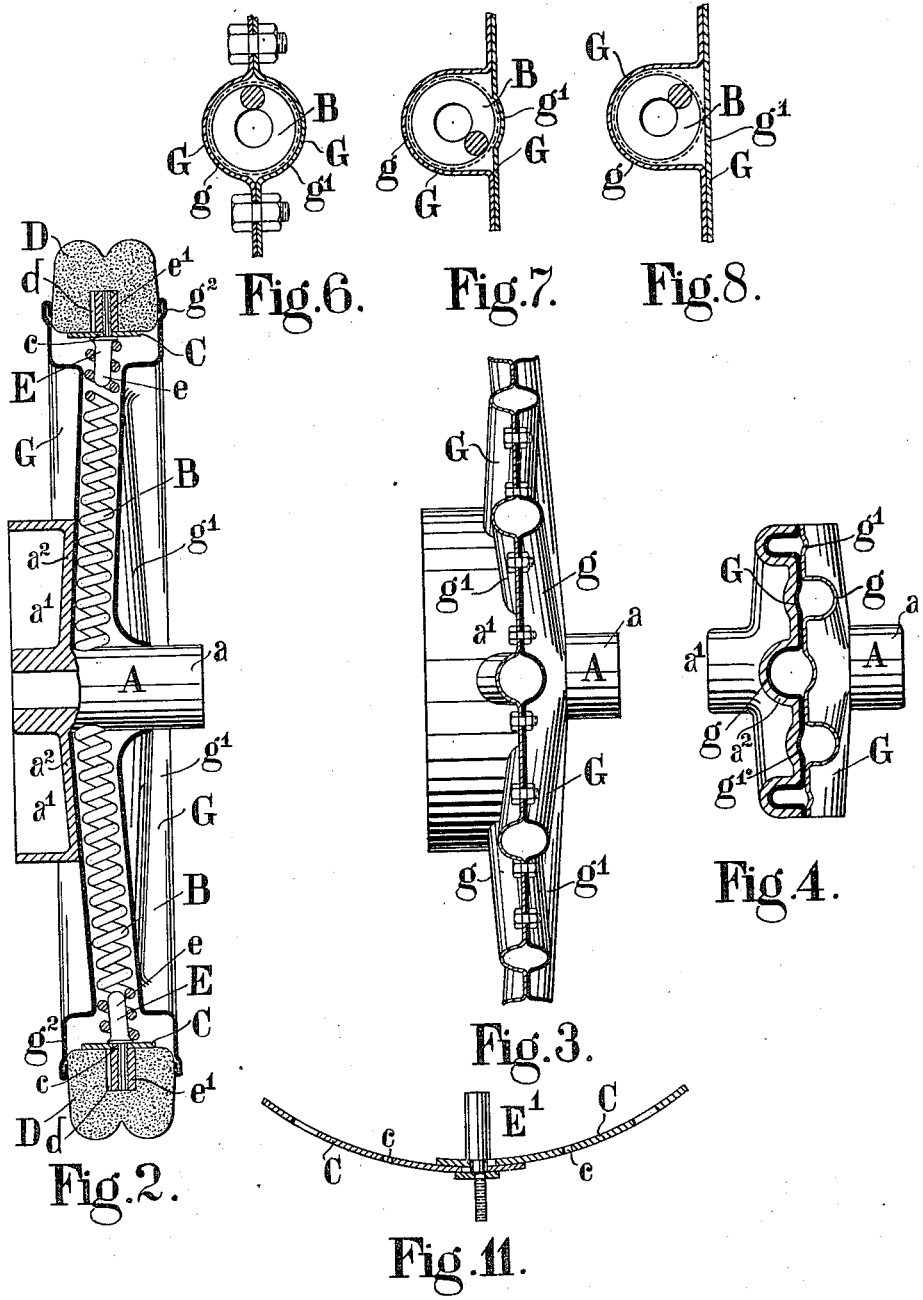

T. WHITEHEAD.
ELASTIC WHEEL.
APPLICATION FILED DEC. 12, 1911.

1,051,178.

Patented Jan. 21, 1913.

3 SHEETS—SHEET 3.

WITNESSES.

INVENTOR.
Thomas Whitehead
by

UNITED STATES PATENT OFFICE.

THOMAS WHITEHEAD, OF BLACKPOOL, ENGLAND.

ELASTIC WHEEL.

1,051,178.

Specification of Letters Patent. Patented Jan. 21, 1913.

Application filed December 12, 1911. Serial No. 665,323.

*To all whom it may concern:*

Be it known that I, THOMAS WHITEHEAD, a British subject, residing at Blackpool, county of Lancaster, England, have invented certain new and useful Improvements in Elastic Wheels, of which the following is a specification.

This invention relates to improvements in elastic wheels in which the rim or tire is supported on a number of spiral springs radiating from the hub.

It consists essentially in the arrangement of the tire and springs and details of construction connected therewith.

It will be fully described with reference to the accompanying drawings forming part of the specification.

Figure 1. is a side elevation of the wheel with the disk plate removed from half of the wheel and the tire in section. Fig. 2. is a transverse sectional elevation. Fig. 3. is an elevation partly in section with the rubber tire and side flanges removed. Fig. 4. is an elevation and section of the wheel on a circle nearer to the center. Fig. 5. is a side elevation in section showing the additional supporting studs. Figs. 6. 7. and 8. are enlarged cross sections through one of the springs and the indentations of the plates. Figs. 9. and 10. are a side elevation and extended plan of spring cushion rim. Figs. 11. and 12 are a side elevation and plan of a modified arrangement of spring cushion rim. Fig. 13 as a part-sectional side elevation of the wheel under compression.

The wheel is built up of a hub A, spiral springs B, elastic cushion plates C, indented side plates G and rubber tire D, so arranged that the springs are supported by the indentations of the side plates and the rubber tire is supported by the springs.

The hub A is constructed with a boss $a$ and a brake rim $a'$ the plate $a^2$ which carries the rim $a'$ being fluted or indented as shown in Fig. 4, to embrace the flutes or indentations $g$ $g'$ of the side plate G. Upon the boss $a$ of the hub A a number of spiral springs B are mounted, radiating therefrom, the bases of the springs being set alternately at the inside and outside of the hub to allow of a greater number being placed around its periphery and to strengthen and give stability to the wheel.

The outer free ends of the springs B are encircled by a flexible elastic steel cushion rim C against which the ends of the spiral springs abut centrally. This spring cushion rim is preferably of sufficient flexibility and elasticity to bend with the load and compress the springs successively upon which the load falls, and is formed in a number of sectional lengths linked together as in Figs. 9 and 10 or overlapping one another as in Figs. 11 and 12.

The ends of the springs B are secured to the inner side of the cushion rim C and the rubber tire D to the peripheral side.

Around the periphery of the spring cushion rim C a number of perforations $c$ are punched into each of which a stud bolt E is fixed which serves the double purpose of securing the springs B and the rubber tire D. The stud $e$ of each of these bolts projects into the interior of one of the spiral springs B and holds the spring and cushion plate in their relative positions. The nut $e'$ on the other end of the bolt which is preferably square fits into a recess $d$ in the tire. These bolts retain the cushion plate C and the tire D in the same relative positions and prevent creeping of the tire. They also prevent lateral displacement of the tire.

In a modification shown in Fig. 5 additional stud bolts E' intermediate of the springs B to give additional lateral stability to the tire D are fitted to the cushion rim C. In this construction the sectional lengths of the cushion rim overlap see Figs. 11 and 12 and the additional studs E' pass through alining perforations formed in the overlaps.

The rubber tire D is recessed on its inner surface at $d'$ to allow of the movement of the tire D and of the spring cushion rim C between the springs.

The wheel is incased by two disk-like face plates G each fluted or indented at $g$ $g'$ to embrace the spiral springs B and formed with extended flanges $g^2$ to inclose the rubber tire D. The indentations $g$ and $g'$ are both semi-circular at the peripheries of the face plates G see Figs. 3 and 6 while the indentations $g$ at the hub of the face plates have a depth which is substantially equal to the diameter of the coils of the springs, and the indentations $g'$ are flat or nearly flat see Figs. 7 and 8. Thus the indentations $g$ increase in size from the periphery to the hub and the indentations $g'$ decrease in size or taper down to flat. When the face plates G are placed together the indentations $g$ of one fit opposite the indentations $g'$ of the other thereby forming pockets which give lateral support to the springs B. The interior of the pockets formed by the indentations g g' may be lined with leather or other material to prevent contact of the springs with the metal of the plates and avoid rattling.

What I claim as my invention and desire to protect by Letters Patent is:—

1. In a vehicle wheel, the combination, with a hub; of a flexible rim composed of connected sections each formed with a central perforation, said sections having their mutually-adjacent ends overlapped and provided with alining perforations; a solid tire mounted upon said rim and having its inner face formed with a series of recesses in register with said central and alining perforations; a series of studs fixed in said central perforations and provided with outwardly- and inwardly-extending portions, the former of which project into the adjacent recesses in said tire; a series of radially-arranged helical springs bearing at opposite ends against said hub and rim, the outer terminal portions of said springs encircling the inwardly-extending portions of said studs; and an additional series of studs fixed in said alining perforations and having outwardly-extending portions which project into the adjacent remaining recesses in said tire.

2. In a vehicle wheel, the combination, with a rim, a tire mounted thereon and a hub; of a pair of opposed face plates mounted upon said hub and formed with registering radial indentations which unite in producing spoke-receiving pockets, said indentations being inclined alternately in opposite directions relative to the vertical plane of the wheel and being of semi-circular cross-sections at their outer ends, and said plates being provided with opposed peripheral flanges arranged to engage said rim and tire; and a series of helical springs disposed within said pockets and bearing at opposite ends against said rim and hub, the indentations of one of said face plates being approximately flat at their inner ends, and the indentations of the other face plate having a depth at their inner ends which is substantially equal to the diameter of the coils of the springs.

3. In a vehicle wheel, the combination, with a rim, a tire mounted thereon, and a hub; of a pair of opposed face plates mounted upon said hub and formed with registering radial indentations which unite in producing spoke-receiving pockets, said indentations being inclined alternately in opposite directions relative to the vertical plane of the wheel, and said plates having their peripheral portions engaged with said rim and tire; and a series of helical springs disposed within said pockets and bearing at opposite ends against said rim and hub.

4. In a vehicle wheel, the combination, with a rim, a tire mounted thereon, and a hub; of a series of helical springs bearing at opposite ends against said rim and hub and inclined alternately in opposite directions relative to the vertical plane of the wheel; and a pair of opposed face plates mounted on said hub and having portions thereof incasing said springs, said face plates having opposed peripheral flanges arranged to engage said rim and tire.

In testimony whereof I have hereunto set my hand in presence of two subscribing witnesses.

THOMAS WHITEHEAD.

Witnesses:
J. OWDEN O'BRIEN,
GEO. H. O'BRIEN.

Copies of this patent may be obtained for five cents each, by addressing the "Commissioner of Patents, Washington, D. C."